J. R. COYLE.
ROTARY VALVE INTERNAL COMBUSTION ENGINE.
APPLICATION FILED JAN. 4, 1915.
1,154,487.
Patented Sept. 21, 1915.
3 SHEETS—SHEET 3.
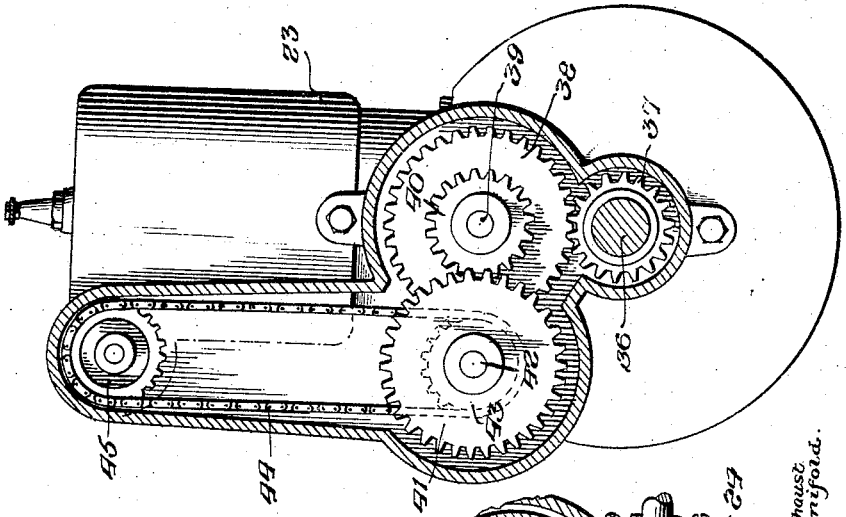
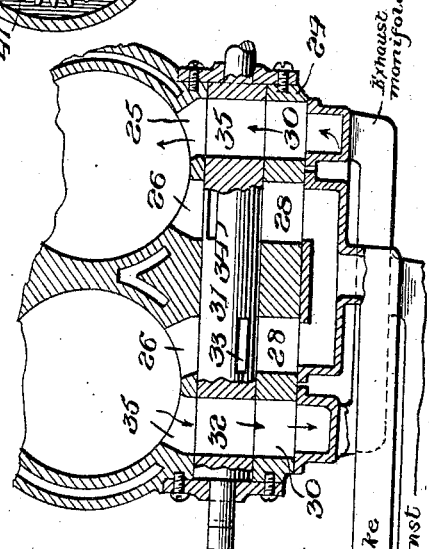
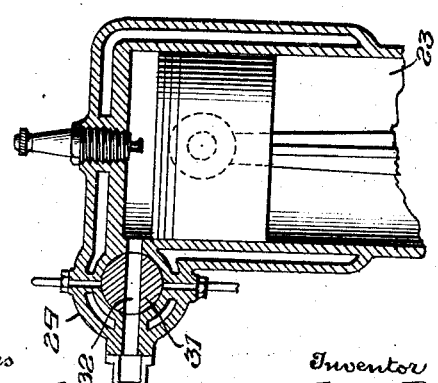
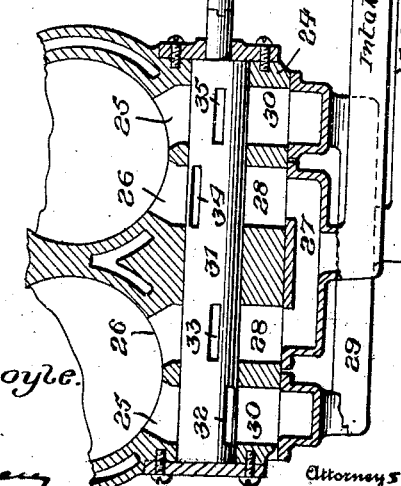
Witnesses
Inventor
James R. Coyle.
By
Attorneys

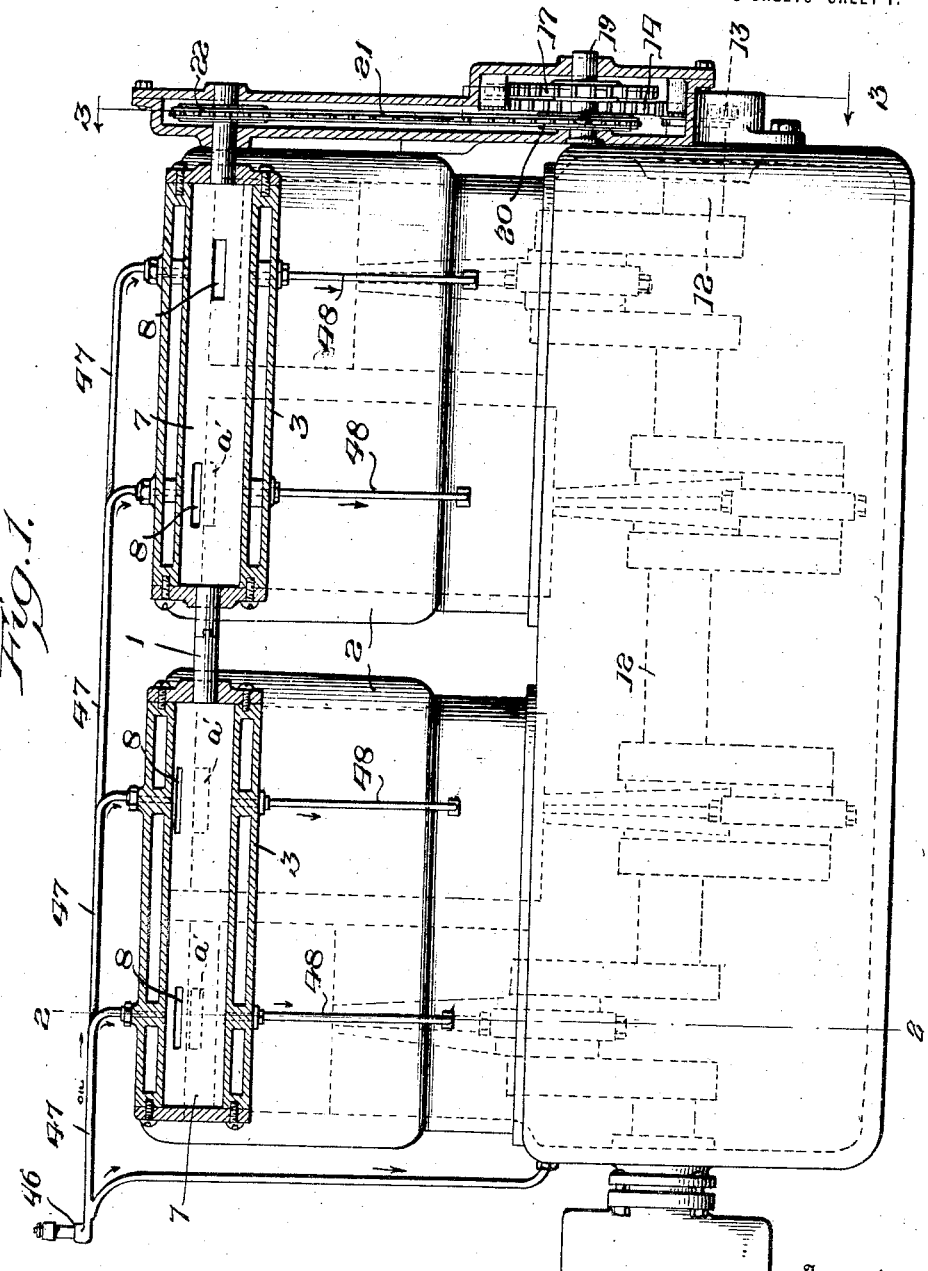

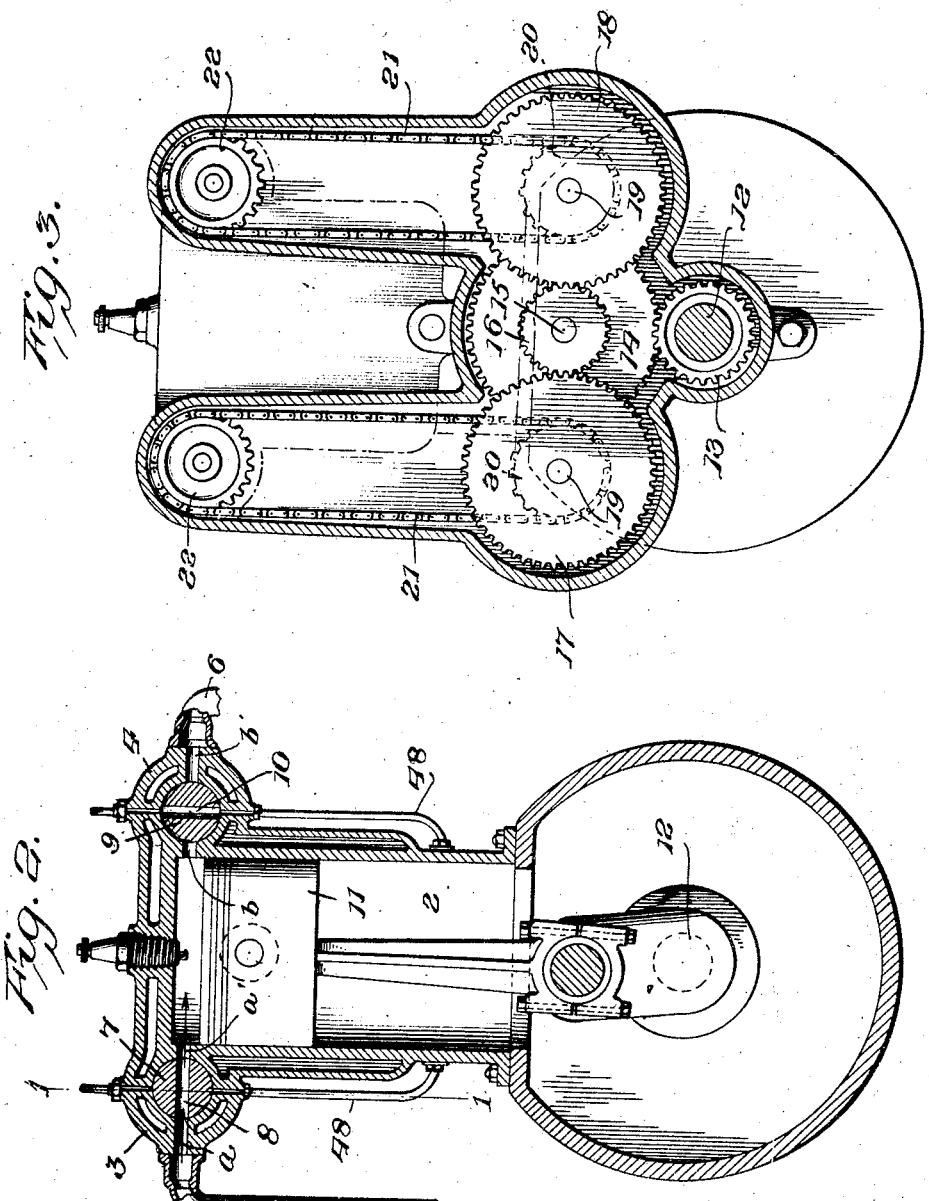

UNITED STATES PATENT OFFICE.

JAMES R. COYLE, OF HUNTSVILLE, ALABAMA, ASSIGNOR OF ONE-FOURTH TO JOHN J. FRIEDEL, OF NORTH CHATTANOOGA, TENNESSEE.

ROTARY-VALVE INTERNAL-COMBUSTION ENGINE.

1,154,487.  Specification of Letters Patent.  Patented Sept. 21, 1915.

Application filed January 4, 1915. Serial No. 408.

*To all whom it may concern:*

Be it known that I, JAMES R. COYLE, a citizen of the United States, residing at Huntsville, in the county of Madison and State of Alabama, have invented certain new and useful Improvements in Rotary - Valve Internal-Combustion Engines, of which the following is a specification.

In the operation of internal combustion engines of the type embodying puppet or reciprocating valves considerable difficulty is experienced and troubles encountered by reason of the failure of such valves to properly seat, this being due chiefly to the pitting of the valve and its seat or the weakening of the valve closing spring. Moreover, engines utilizing puppet valves for controlling the intake and exhaust require a cam shaft. This construction is also open to the objection of noise resulting from the seating of the valves and the engaging of the cams with the valve stems or push rods according to the type of engine.

The primary purpose of this invention is the provision of an internal combustion engine of the four-cycle variety having a rotary valve for controlling the intake and the exhaust, thereby greatly simplifying the construction and overcoming wholly or in part the many objections and troubles incident to engines embodying puppet valves.

The invention has for its object the provision of a valve casing having a cooling jacket and a rotary valve mounted in the valve casing and formed with diametrical ports, such valve being operated, so that at each one-half revolution, the engine or crank shaft makes four cycles, such valve alternately presenting opposite ends of the port to the cylinder port.

A further purpose of the invention is to greatly simplify the construction of internal combustion engines of the four-cycle variety by reducing the number of parts and also to increase the life and efficiency of the engine and avoiding the necessity for grinding valves and replacing and adjusting valve parts in order to overcome the noise due to the operation of valves of the puppet type.

The invention consists of the novel features, details of construction and combinations of parts which hereinafter will be more particularly set forth, illustrated in the drawings hereto attached and subsequently claimed.

Referring to the drawings, Figure 1 is a side view of an internal combustion engine of the four cylinder type provided with a valve structure embodying the invention, the valve casings and the housing for the valve gearing being in section on the line 1—1 of Fig. 2. Fig. 2 is a transverse section on the line 2—2 of Fig. 1; Fig. 3 is a transverse section on the line 3—3 of Fig. 1, looking to the left, as indicated by the arrows; Fig. 4 is a cross section of a modification showing the invention adapted to an engine of the L-type; Fig. 5 is a detail view showing the valve gearing for the engine of the type illustrated in Fig. 4; Fig. 6 is a sectional detail of a four-cylinder engine of the type shown in Fig. 4.

Corresponding and like parts are referred to in the following description and indicated in all the views of the drawing by the same reference characters.

The engine illustrated in Fig. 1 and the detail views thereof is of the T-type and embodies four cylinders which, as shown, are cast in pairs although this is not essential. Within the purview of the invention the number of cylinders and the manner of forming the same are unimportant so long as the engine embodies a valve casing and a rotary valve, the latter being geared to the engine or crank shaft so as to make one revolution for each four revolutions of the crank shaft.

As indicated most clearly in Fig. 1 each block of cylinders is formed with a valve casing in which is mounted a rotary valve, the valves on the same side of the engine being in line and coupled in any preferred way, as indicated at 1 which is a clutch of the Oldham type. The cylinders and valve casings are alike as are also the valves, hence a detailed description of one will suffice for a clear understanding.

Referring to Fig. 2 the cylinder is designated by the numeral 2 and is provided at its upper end with opposite valve casings 3 and 4. The cylinder as well as the valve casings are jacketed to admit of the circulation of a cooling medium. The numeral 3 designates the intake valve and the numeral 4 the exhaust. Each valve casing 3 or 4 is of similar or like formation and is provided at diametrically opposite points with ports. The ports of the valve casing 3 are designated by the reference letters *a* and *a'*. The ports of the valve casing 4 are indicated at $b$ and $b'$. The intake pipe 5 connects with the valve casing 3 and registers with the port $a$. The port $a'$ opens directly into the cylinder 2. The exhaust pipe 6 connects with the valve casing 4 and is in communication with the port $b'$. The port $b$ opens directly into the cylinder 2. The rotary valve 7 is mounted in the casing 3 and is formed with a diametrical port 8. The rotary valve 9 mounted in the casing 4 is formed with a diametrical port 10. The valves 7 and 9 are connected for simultaneous rotation. The port 8 of the valve 7 registers with the ports $a$ and $a'$ during one cycle or stroke of the piston which is when the engine is drawing in a charge. During the remaining three cycles, or strokes, corresponding with compression, explosion and scavenging, the valve 7 occupies a position with the port 8 out of register with the ports $a$ and $a'$. The valve 9 occupies a position with its port 10 in register with the ports $b$ and $b'$ during the cycle or stroke of the piston when the cylinder is being scavenged or cleared of the burnt gases. During the remaining three strokes or cycles of the piston the valve 9 occupies a position with its port 10 out of register with the ports $b$ and $b'$.

The piston 11 is connected with a crank of the crank shaft 12 in any manner. The valves are geared to the crank shaft to be driven therefrom. The manner of connecting the valves with the crank shaft is unimportant so long as the valves make one complete revolution for each four revolutions of the crank shaft, hence at each two complete revolutions of the crank shaft the valve makes one-half a revolution and the port therein is reversed but at the same time the engine has made four cycles or piston strokes. As indicated in Figs. 1 and 3 the crank shaft 12 has a spur gear 13 secured thereto and this spur gear is in mesh with a gear wheel 14 mounted upon a stud 15. The gear wheels 13 and 14 are of such relative size that during two complete revolutions of the crank shaft the gear wheel 14 makes only one complete revolution. A gear wheel 16 is connected with the gear wheel 14 so as to rotate therewith and meshes with gear wheels 17 and 18. The gear wheels 16 and 17 and 16 and 18 are of such relative diameters that during two complete revolutions of the gear wheel 16 each of the gear wheels 17 and 18 makes only one complete revolution. The gear wheels 17 and 18 are mounted on studs 19 and each has a sprocket gear 20 connected therewith. A drive chain or belt 21 connects each of the sprocket wheels 20 with a corresponding sprocket wheel 22 secured to the stem of the respective valves. The sprocket wheels 20 and 22 are of like diameters. The gearing is such as to rotate each of the valves 7 and 9 once for each complete four revolutions of the crank shaft 12 and at each one-half revolution of the valves the crank shaft makes two complete revolutions which correspond to four cycles or piston strokes, hence at each working stroke of a piston the valve makes a half turn, thereby reversing the port.

In the form of engine illustrated in Fig. 4 and the detail views thereof the cylinder 23 is provided with a single valve casing 24, such valve casing and cylinder being jacketed for the circulation of a cooling agent. Each cylinder is formed with two ports 25 and 26 and the valve casing is formed with corresponding ports in register therewith. The intake manifold 27 communicates with the intake ports 28 of the valve casing. The exhaust manifold 29 connected to the valve casing communicates with the exhaust ports 30 thereof. The rotary valve 31 mounted in the valve casing 24 is formed with diametrical ports 32, 33, 34, and 35 which are adapted to register with the respective ports of the valve casing so as to properly control the intake and the exhaust.

In Fig. 5 is illustrated a valve gearing connecting the valve 31 with the engine or crank shaft 36 in such a manner as to admit of the crank shaft making four revolutions for each complete revolution of the valve. A gear wheel 37 secured to the crank shaft 36 meshes with a gear wheel 38 mounted upon a stud 39. The gear wheels 37 and 38 are of such relative proportions as to admit of the crank shaft making two revolutions while the gear wheel 38 is making one revolution. A gear wheel 40 connected with the gear wheel 38 is in mesh with a gear wheel 41 mounted upon a stud 42. The gear wheels 40 and 41 are of such relative diameters as to admit of the gear wheel 40 making two revolutions during one revolution of the gear wheel 41. A sprocket wheel 43 connected with the gear wheel 41 is connected by means of a sprocket chain 44 with a sprocket wheel 45 connected with the valve 31. Inasmuch as the sprocket wheels 43 and 45 are of like diameter the valve 31 makes two revolutions for each revolution of the gear wheel 41. It will thus be understood that at each revolution of the valve 31 the crank shaft 36 makes four revolutions. It follows, therefore, that for each one-half revolution of the valve 31 the crank shaft 36 makes two complete revolutions corresponding to four cycles of the engine. At each working stroke of the piston the valve makes a half turn thereby reversing the port therein.

For proper lubrication of the valves and pistons of the engine a sight feeder 46 is provided and located in convenient position and a tube 47 extends from such sight feeder to each end portion of the valve casings and a second tube 48 leads from the valve casing to the cylinder. Surplus oil from the valve casings passes off to the cylinder for lubricating the piston.

From the foregoing taken in connection with the accompanying drawings it will be understood that the invention may be applied to any type of engine embodying any number of cylinders and as a result the number of parts are reduced, the operation of the valve and valve gear made noiseless and a greater number of units of force made available for an engine of a given diameter and stroke.

It is also understood that in the practical embodiment of the invention to meet varying conditions changes in the form, proportion and minor details may be resorted to without departing from the nature of the invention as claimed.

Having thus described the invention, what is claimed as new, is:—

In an internal combustion engine, a cylinder having oppositely disposed offstanding valve casings at its outer end, each valve casing having diametrically opposed ports, a rotary valve mounted in each valve casing and having a diametrical port, a crank shaft, a spur gear secured to the crank shaft, an idle gear wheel in mesh with the spur gear, a second gear wheel connected with the idle gear wheel to rotate therewith, two gear wheels of larger diameter than the second gear wheel and in mesh therewith, sprocket wheels connected with the two gear wheels, other sprocket wheels connected with the stems of the valves and sprocket chains connecting the sprocket wheels, whereby for each four cycles of the crank shaft the valves make a one-half revolution.

In testimony whereof I affix my signature in presence of two witnesses.

JAMES R. COYLE. [L. S.]

Witnesses:
 LOUIS L. WIER,
 TOM K. HAGGARD.